March 5, 1957 A. BOSCHI ET AL 2,783,959
RUBBER SPRING FOR ELASTIC MOUNTINGS
Filed July 25, 1952 3 Sheets-Sheet 1
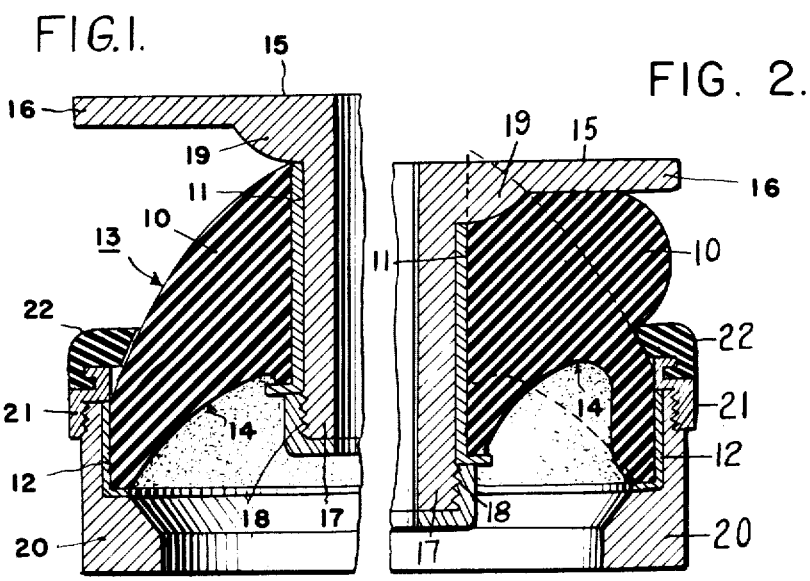
INVENTORS
Antonio Boschi,
Vittorino Mastropietro, United States Patent Office 2,783,959
Patented Mar. 5, 1957

2,783,959

RUBBER SPRING FOR ELASTIC MOUNTINGS

Antonio Boschi and Vittorino Mastropietro, Milan, Italy, assignors to Pirelli Societa per Azioni, Milan, Italy Application July 25, 1952, Serial No. 300,946

2 Claims. (Cl. 248—22)

This invention pertains to non-metallic springs and mountings and more particularly relates to springs and mountings of rubber or rubber-like materials for vehicles and machinery, and this application is a continuation-in-part of our application Serial No. 771,173, filed August 29, 1947, now abandoned.

It is well known that certain truly elastic materials, such as steel, show a deformation under load substantially in proportion to the magnitude of the impressed force. For such materials the modulus of elasticity is substantially constant up to the elastic limit of the material. Other resilient materials, not truly elastic, such as rubber, exhibit progressively decreasing deformation with increasing load, particularly when subjected to forces causing compression of the material. This phenomenon appears to be due to the fact that when such materials are deformed in compression, and especially when their deformations are restrained by surrounding non-yielding containers, the action of the stressing forces seems to increase the density and cohesion of the fibers and molecules of the material, thereby making the material more resistant to deformation.

In some cases this peculiarity of flexible materials, such as rubber, can be useful in those applications where a progressive damping of excessive stresses or deformations is required, while in other cases it is detrimental, as for example, where it is desired to provide a spring having small but increasing deformation rate during the first phase of its loading, corresponding to the static load or tare weight of a supported machine or vehicle; a greater and substantially proportional deformation rate in the second phase of its loading, corresponding to the addition of the normal live load of the supported machine or vehicle; and again a smaller but decreasing deformation rate in the third phase of its loading, coresponding to overloads caused by shocks from rough road conditions.

As rubber and rubber-like materials are widely used for springs and resilient mountings for vehicles and machinery, where it is desirable to obtain the three-phase deformation characteristics just mentioned, it is important to devise ways and means whereby rubber and rubber-like materials can be made to exhibit these characteristics. We have found that one means to this end is to subject the spring or resilient mounting during the first and third phases of its loading to a given stress (e. g. compression) and to a different kind of stress (e. g. shear-flexion) during the second phase of its loading. As a practical matter, these stresses can not be separated into two simple and distinct phenomena. On the contrary, the stress during the first and third phases is not one of pure compression only, and in the second phase of pure shear-flexion only, but is definitely a combination of the two in all three phases, with the compressive stress having predominance during the first and third phases and the shear-flexion stress during the second phase. This characteristic pattern of performance is greatly aided by giving the resilient rubber element certain peculiar and novel shapes and confining its load receiving and load transmitting surfaces by contoured rigid restraining members to modify but not preclude its free deformation under load.

Another means of obtaining a resilient mounting having the desired deformation characteristics is to so shape the transverse section of the rubber and metal elements as to bring progressively increasing areas of the rubber into contact with the metal surfaces as the load increases.

By these two means the total deformation of the rubber element with each increment in load can be made to bear any selected ratio to such load as will be more specifically indicated hereinafter.

It is accordingly an object of this invention to provide a spring or resilient mounting of rubber or rubber-like material in which the total deformation of the spring or mounting with each increment of load bears a selected ratio to such load.

Another object of this invention is to provide a spring or resilient mounting in which the stress during the first and third phases of its loading is predominantly compressive and during the second phase, predominantly that of shear-flexion.

Still another object of this invention is to provide a spring or resilient mounting of rubber or rubber-like material in which its deformation under load is modified by non-yielding container walls so as to cause the rubber to assume certain definite shapes during the three phases of its loading.

A further object is to provide a spring or resilient mounting having rubber and rigid metal elements so shaped as to bring progressively increasing areas of the rubber into contact with the metal elements as the load increases, in accordance with a selected pattern.

With these and other objects in view, which may be incident to our improvements, our invention consists in the combination and arrangement of elements hereinafter described and illustrated in the accompanying drawing in which:

Figure 1 is a longitudinal section of a resilient mounting according to our invention, showing the shape of the undeformed rubber element before load is applied;

Figure 2 shows the deformed shape of the rubber element after load is applied;

Figure 3:
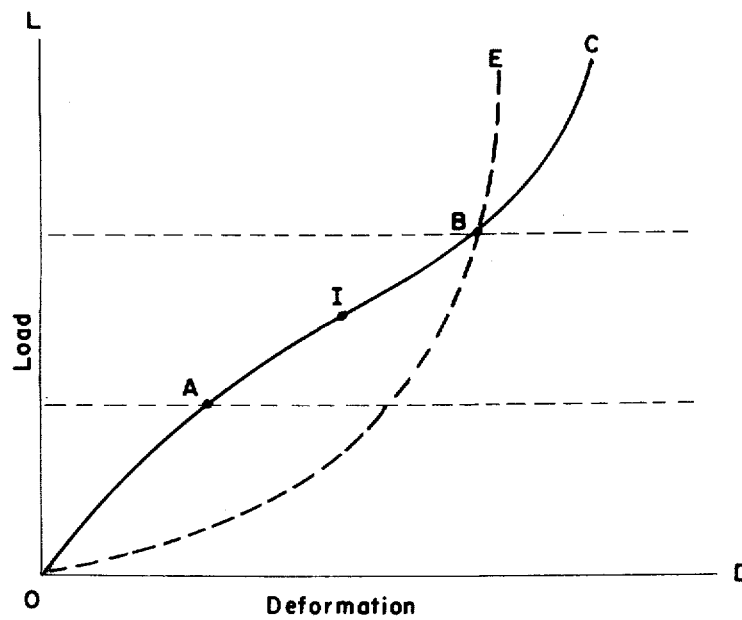
Figure 3 is a diagram showing the comparative load/deformation curves of the prior art mountings in contrast to our invention as shown in Figs. 1 and 2.

Referring to Figure 1, this shows an example of a practical application of our invention, in which the spring or resilient mounting comprises a high-pitched dome-shaped, annular member 10 of rubber or rubber-like material firmly bonded to an inner metal sleeve 11 and an outer cylindrical metal bushing 12. The rubber member 10 has a convex outer surface 13 and a concave inner surface 14, the former having a higher pitch and greater curvature than the latter, whereby the thickness of the annulus decreases from its inner to its outer edge, as clearly shown in Figure 1. A rigid, load-transmitting, metal plate member 15 consists of flat upper flange 16 integral with a lower depending cylindrical stem 17 which telescopes within the bushing 11 and is secured firmly therein by a threaded cap 18. The upper end of the bushing 11 contacts the inner edge of a rounded shoulder 19 of the member 15 so that a major portion of the downward thrust of said member by its supported load is transmitted to the rubber member 10 through the sleeve 11 bonded thereto. The outer bushing 12 is seated on an annular shoulder of a metallic base 20 and is secured in place by a flange ring 21 threaded to the base 20. A rubber covering ring 22 is crimped over the upper edge of the ring 21 to act as a buffer and cushion any contact which might occur between the flange 16 and the ring 22 under exceptionally heavy loads.

When a load is applied to the member 15 it exerts a downward thrust on the rubber dome 10 which progressively deforms it into the shape of a dome with flattened top and steeper sloped sides, until ultimately the member 10 assumes the shape shown in Fig. 2. While the inside walls of the base 20 and the ring 21 restrain the lower part of the rubber member 10 from spreading radially below the top of the ring 21, so that the outer configuration of this part of the member 10 remains essentially cylindrical, the greater portion of said member above the top of ring 21 is free to expand radially, so that the member 10 continues to resist the load predominantly by the shear-flexion stresses of arch action.

In contrast to prior art devices, it will be observed that when a load is applied to our improved mounting shown in Figure 1, its outer surface is moved radially outward from its vertical axis. Also, the lower surface 14 of the rubber member 10 (Figure 2) is greatly deformed under load and assumes the highly curved, arched profile shown in Figure 2, whereby the stresses in rubber member 10 are predominantly those of shear-flexion.

During the first phase of loading the mounting shown in Figure 1, the upper portion of the rubber member 10 sustains the greater part of the total deformation, first assuming the shape of the shoulder 19, Figure 2, and then following the flat under surface of flange 16. During this phase of loading, the stress in member 10 is predominantly that of simple compression, but when the load increased beyond the limit of the first phase (i. e. live load is added to the dead weight load), the stresses in member 10 are predominantly those of shear-flexion, because the greater portion of the load is transmitted by sleeve 11 to the middle and lower parts of member 10.

The amount of deformation of member 10, measured in a vertical line, for each increment of load is regulated by the contours of the convex and concave surfaces of member 10, as well as by the shape of the under surface of shoulder 19 and flange 16, and the coordination action of the contacting rubber and metal surfaces makes the deformation of the member 10 follow a selected load/deformation ratio throughout all three phases of loading, as indicated by the curve OABC in Figure 3.

The difference in the nature of the stresses developed under load by the prior art mounting and by our improved mounting Figures 1 and 2 is clearly illustrated in Figure 3, wherein the dotted curve OE indicates the load/deformation ratio for a prior art rubber element, while the full line curve OABC indicates the load/deformation ratio of the rubber element 10 (Figs. 1 and 2). As will be noted from curve OE in Fig. 3, the deformation OD of the prior art rubber element progressively decreases as the load OL increases, whereby the spring of the prior art element becomes increasingly stiffer in action as the load is increased. On the contrary, as indicated by the curve OABC, the deformation of the rubber element 10 (Figs. 1 and 2), during the first phase of load (i. e. dead load only), progressively increases with increasing load (curve OA), during the second phase of load (i. e. normal live load added), the deformation is substantially proportional to the load (curve AB), being somewhat greater below the point of inflexion I and somewhat less above said point, while during the third phase of loading (i. e. sudden increase in live load by dynamic effect of road shocks), the deformation progressively decreases with increased load (curve BC), whereby the mounting becomes increasingly stiffer in action to better resist road shocks.

By referring to the profile of rubber element 10 (Figures 1 and 2), it will be noted that it has a high, steeply pitched dome shape (when unloaded); also 10 is greatly altered in shape by loading, as clearly shown by the dotted lines in the right half sections of Figure 2. Furthermore, the deformation of prior art rubber elements under load is essentially one of compression and there is no radial expansion; whereas the deformation of rubber element 10 (Figures 1 and 2) under load is that resulting from a combination of compression and shear flexion, wherein said rubber element is greatly expanded radially. It is due to these differences in deformation under load between the rubber elements of the prior art and 10 (Figure 2) of the present invention that the markedly different load/deformation curves OE and OABC in Figure 3 are obtained.

By suitably changing the shape and arrangement of the rubber element 10 (Figures 1 and 2) and the contacting surfaces of the metal parts 16, 19 and 20, the load/deformation ratio of our resilient mounting can be changed to almost any form of curve desired. Of course, these variables have to correspond in each particular mounting to a given size ratio, and where the supported load can not be carried by one spring, two or more parallel acting springs are provided.

When a prior art spring of the type is subjected to a vertically imposed load, the rubber element therein is stressed only in compression, because of its relatively flat shape and the circumferential restraining effect of the metal parts of such springs which enclose a relatively large part of said rubber element and prevent any lateral or radial expansion thereof under load. Owing to this shape and the restraining effect of the metal parts, the prior art rubber element does not develop any appreciable compression-flexion or shear flexion stresses when the spring is subjected to a vertically imposed load, and therefore the deformability of the rubber element progressively decreases with increasing load which imparts a progressively increasing resistance and stiffness to the spring, as the imposed load is increased.

Because the rubber elements of prior art springs are prevented from expanding radially under load and are stressed only in compression throughout their working ranges, they are inherently incapable of developing a load-deformation ratio that increases with increasing load, and are further inherently incapable of resisting a vertically imposed load, by an initial stress predominantly of one type (e. g. compression) up to a first and beyond a second selected point in their load range, and subsequently by a stress of a predominantly different type (e. g. shear flexion), as the imposed load is increased between said points; as is the case with springs constructed in accordance with the invention disclosed in this application.

When a spring, constructed in accordance with this invention, is subjected to a vertically imposed load, the rubber element, being free to expand radially, initially develops mainly a compression-flexion stress and a relatively slight shear-flexion stress, depending upon a greater or lesser predominance of compression modulus E over shear-flexion modulus G. When the central part of the rubber element flattens with increasing load, the stress in the rubber element gradually becomes mainly a shear-flexion stress, passing from modulus E to the smaller modulus G, with consequent increase in deformability and flexibility. Such mode of operation and results are impossible of attainment in prior art devices.

The difference in behavior of springs constructed in accordance with our invention, in comparison with the behavior of prior art springs, has been ascertained by physical laboratory tests and photoelastic studies of the action of such rubber springs under load.

Having described the operation of the spring and how the shapes of the rubber dome and contacting metal plate influence the load-deformation curve, we now stress the factors which determine the performance characteristics of our improved spring:

(1) The hardness of the rubber mix used determines the general stiffness of the spring and the steepness of the load deformation curve, but not the shape of the spring, which depends on other factors.

(2) The shape and thickness of the dome are of fundamental importance and influence both the steepness and the shape of the load/deformation curve.

(3) The shape and height of the outer base ring limit the deformation in a way similar to the upper plate, though to a lesser degree.

By combining these various factors we can obtain load/deformation curves which differ greatly from one another. Thus, the curve OABC in Figure 3 shows a double flexibility variation obtained by using the plate illustrated in Figures 1 and 2. If the spring operates, under normal live loads, in the portion A—B of the curve shown in Figure 3, it is possible to obtain a decidedly greater flexibility than would be the case with a prior art rubber spring having the same total deflection because the flexibility between points O and A is considerably reduced. Moreover, a progressive bump is reached when full compression has been obtained. In the second place, which is of great importance, the inclination of the curve, and therefore the stiffness of the spring, varies a great deal around the points A and B; the spring is therefore "aperiodical" and there is no danger of resonance, because, when points A or B have been passed after the first oscillations, the frequency of the system changes rapidly with the change in stiffness.

It is to be noted that considerable variations to the diagram can be obtained by simply modifying the upper plate 15 (Figures 1 and 2); this can be done by the assembly in the final stage of construction that is, the plate itself can be changed, without touching the spring proper.

Figure 4:
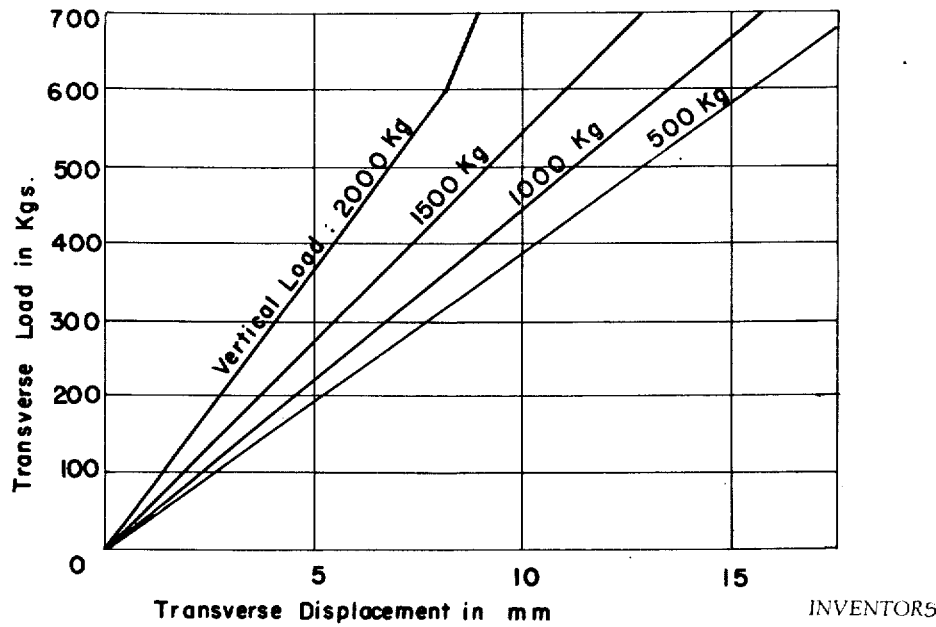
Figure 4 is a diagram showing the increase in transverse stiffness of the mounting shown in Figure 2 with increase in vertical load.

The transverse stiffness of the dome-shaped rubber element 10 (Figures 1 and 2) increases as the vertical loads increase, as indicated by the curves shown in Figure 4; the greater the axial loads therefore, the greater is the resistance to transverse displacements, which eminently meets the needs of practical applications. The transverse stiffness of the dome-shaped rubber element 10 (Figures 1 and 2) is generally sufficiently great to act as a vertical guide, which can in the case of tram and railway car applications replace the usual mechanical guides.

Figure 5:
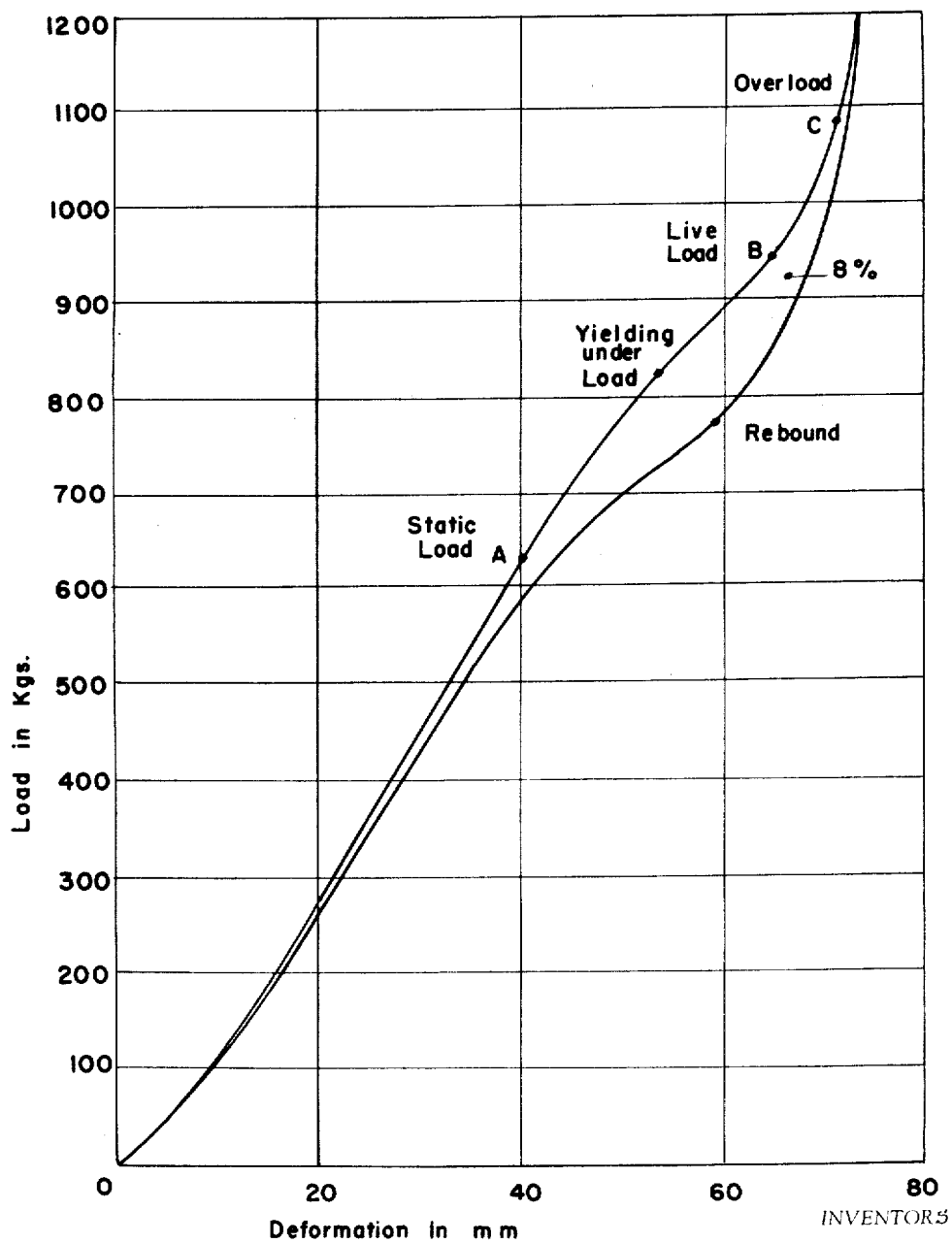
Figure 5 is a diagram showing the hysteresis area of the mounting shown in Figure 2, during a cycle of loading from zero to maximum load and unloading from maximum to zero load.

Finally, another important characteristic of the dome-shaped rubber element 10 (Figures 1 and 2) is its behaviour in relation to work absorbed, that is its area of hysteresis. A load/deformation curve (from minimum to maximum load and return) is shown in Figure 5, and from this it will be seen not only that there may be from 15 to 18% dissipation, but also that the greatest dissipation takes place in the working stretch of the curve, that is between points A and B.

The essence of our invention lies in devising springs or resilient supports which are subjected in the first and third phases of loading to one type of stress and in the second phase of loading to a different type of stress, but always so related that the elastic deformation of the spring or support per unit load is relatively greater during the second phase than during the first and third phases.

While we have shown and described the preferred form of our invention, we desire it to be understood that we do not limit ourselves to the constructural details disclosed by way of illustration, as these may be readily changed and modified by those skilled in the art without departing from the spirit of our invention or exceeding the scope of the appended claims.

We claim:

1. A spring comprising a dome-shaped elastic member having a central axial bore with a cylindrical wall and a cylindrical outer wall at its widest portion concentric to the wall of said bore, an inner cylindrical bushing within said bore and to which bushing the wall of said bore is bonded, an outer cylindrical bushing to the inner wall of which said outer wall is bonded, a load transmitting member including a metal plate secured to and extending laterally from said inner bushing adjacent the upper outer surface of said elastic member whereby its surface may engage the outer surface of said elastic member when said plate is thrust axially of said elastic member, and a supporting base for said outer cylindrical bushing enabling said outer bushing to resist downward and outward thrust of said elastic member laterally and endwise from the peripheral portion of said elastic member, the shape of said dome-shaped elastic member being such that the wall of the bore along said inner bushing when not under compression is higher than the upper edge of the outer wall.

2. A spring comprising a dome-shaped elastic member having a central axial bore with a cylindrical wall and a cylindrical outer wall at its widest portion concentric to the wall of said bore, and inner cylindrical bushing within said bore and to which bushing the wall of said bore is bonded, an outer cylindrical bushing to the inner wall of which said outer wall is bonded, a load transmitting member including a metal plate secured to and extending laterally from said inner bushing adjacent the upper outer surface of said elastic member whereby its surface may engage the outer surface of said elastic member when said plate is thrust axially of said elastic member, and a supporting base for said outer cylindrical bushing enabling said outer bushing to resist downward and outward thrust of said elastic member laterally and endwise from the peripheral portion of said elastic member, both the upper and lower contours of said elastic member being dome-shaped and progressively thicker from the outer wall toward said bore.

References Cited in the file of this patent

UNITED STATES PATENTS

| | | |
|---|---|---|
| 2,147,660 | Loewus | Feb. 21, 1939 |
| 2,196,428 | Saurer | Apr. 9, 1940 |

FOREIGN PATENTS

| | | |
|---|---|---|
| 435,023 | Great Britain | Sept. 6, 1935 |
| 506,801 | Great Britain | June 2, 1939 |
| 524,203 | Great Britain | Aug. 1, 1940 |
| 621,693 | Great Britain | Apr. 14, 1949 |
| 801,707 | France | May 23, 1936 |

UNITED STATES PATENT OFFICE
CERTIFICATE OF CORRECTION

Patent No. 2,783,959                                          March 5, 1957

Antonio Boschi et al.

It is hereby certified that error appears in the above numbered patent requiring correction and that the said Letters Patent should read as corrected below.

In the grant, line 13, strike out "for the term of SEVENTEEN years from the date of this grant" and insert instead -- For the term from the date of this grant until March 18, 1963 --; in the heading to the printed specification, following "Application July 25, 1952, Serial No. 300,946" insert the following:

In Italy March 18, 1943
Section 1, Public Law 690, August 8, 1946
Patent expires March 18, 1963

Signed and sealed this 24th day of September 1957.

(SEAL)
Attest
KARL H. AXLINE
Attesting Officer

ROBERT C. WATSON
                                                                     Commissioner of Patents